United States Patent
Santamaria et al.

(10) Patent No.: US 7,630,558 B2
(45) Date of Patent: Dec. 8, 2009

(54) DIRECTION-SENSITIVE LINE DETECTION OPERATOR FOR IMAGE DATA

(75) Inventors: Carlos Santamaria, Surrey (GB); Miroslaw Bober, Surrey (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 438 days.

(21) Appl. No.: 11/148,990

(22) Filed: Jun. 10, 2005

(65) Prior Publication Data

US 2006/0008153 A1 Jan. 12, 2006

(30) Foreign Application Priority Data

Jul. 1, 2004 (EP) ................... 04253989

(51) Int. Cl.
*G06K 9/56* (2006.01)
(52) U.S. Cl. ............ 382/205; 382/190; 382/195; 382/199; 382/263; 382/266; 382/276; 382/307; 382/308
(58) Field of Classification Search ............ 382/190, 382/195, 199, 205, 260, 263, 266, 276, 307, 382/308
See application file for complete search history.

(56) References Cited

U.S. PATENT DOCUMENTS 5,121,364 A * 6/1992 O'Donnell ............ 367/98
5,859,929 A * 1/1999 Zhou et al. ............ 382/197
6,690,375 B2 * 2/2004 Ogawa et al. ............ 345/582

OTHER PUBLICATIONS

Bo et al., "Issues in Geographic Data Quality Assessment by Remote Sensing Techniques," *IEEE 2001 International Geoscience and Remote Sensing Symposium*, Sydney, Australia, Jul. 9-13, 2001, pp. 1916-1918.
Dherete et al., "Extraction of Geographic Features Using Multi-Operators Fusion," *Proceedings from SPIE Conference, EUROPTO Conference on Image and Signal Processing for Remote Sensing*, Barcelona, Spain, Sep. 1998, vol. 3500, pp. 418-428.
Fischler et al., "Detection of Roads and Linear Structures in Low-Resolution Aerial Imager Using a Multisource Knowledge Integration Technique," Computer Graphics and Image Processing, vol. 15, 1981, pp. 201-223.
Huber et al., "Road Extraction from High-Resolution Airborne SAR Using Operator Fusion," *IEEE 2001 International Geoscience and Remote Sensing Symposium*, Sydney, Australia, Jul. 9-13, 2001, pp. 2813-2815.
Parui et al., "A Parallel Algorithm for Detection of Linear Structures in Satellite Images," *Pattern Recognition Letters*, Dec. 12, 1991, vol. 12, No. 12, pp. 765-770.

* cited by examiner

*Primary Examiner*—Vikkram Bali
*Assistant Examiner*—Daniel Zeilberger
(74) *Attorney, Agent, or Firm*—Birch, Stewart, Kolasch, & Birch, LLP.

(57) ABSTRACT

A method of detecting lines in an image comprises using one or more masks for detecting lines in one or more directions out of horizontal, vertical, left diagonal and right diagonal, and further comprises one or more additional masks for detecting lines in one or more additional directions.

14 Claims, 15 Drawing Sheets

Fig. 1A    Fig. 1B    Fig. 1C    Fig. 1D

"CONVENTIONAL ART"

Fig. 2A    Fig. 2B    Fig. 2C    Fig. 2D

"CONVENTIONAL ART"

| | | | | | | | | | | | | | | |
|---|---|---|---|---|---|---|---|---|---|---|---|---|---|---|
| 3H/1V | | b2 | b3 | b4 | | | | | | | | | | |
| | b1 | | | | | | | | | | | | | |
| | | | a3 | a4 | | | | | | | | | | |
| | | a1 | a2 | | | | | | | | | | | |
| | | | | | c4 | | | | | | | | | |
| | | c1 | c2 | c3 | | | | | | | | | | |

| 3H/2V | | b3 | b4 | | | | | b2 | b3 | b4 | | |
|---|---|---|---|---|---|---|---|---|---|---|---|---|
| | b2 | | | | | | b1 | | | a4 | | |
| | b1 | | a3 | a4 | | | | | a3 | | | |
| | | a2 | | | | | a1 | a2 | | | c4 | |
| | a1 | | | c4 | | | | | | | c3 | |
| | | c1 | c2 | c3 | | | | | c1 | c2 | | |

| 1H/3V | | b4 | | | | |
|---|---|---|---|---|---|---|
| | b3 | | a4 | | | |
| | b2 | | a3 | c4 | | |
| | b1 | a2 | | c3 | | |
| | | a1 | | c2 | | |
| | | | c1 | | | |

| 2H/3V | | b3 | b4 | | | | | b4 | | | |
|---|---|---|---|---|---|---|---|---|---|---|---|
| | b2 | | | a4 | | | b3 | | a4 | | |
| | b1 | | a3 | | c4 | | b2 | | a3 | | |
| | | a2 | | | c3 | | b1 | a2 | | c4 | |
| | | a1 | | | c2 | | a1 | | | c3 | |
| | | | c1 | | | | | | c1 | c2 | |

DIRECTION-SENSITIVE LINE DETECTION OPERATOR FOR IMAGE DATA

The invention relates to a method and apparatus for detecting lines in images.

M. A. Fischler, J. M. Tenenbaum and H. C. Wolf. *Detection of roads and linear structures in low-resolution aerial imagery using a multisource knowledge integration technique*. Computer Graphics and Image Processing, 15, pp. 201-223, 1981 relates to the Duda Road Operator.

The Duda Road Operator (DRO) is an operator specialized in line detection suggested by R. O. Duda and first used in a road detection scenario in this paper. It is used to detect roads in low resolution images based on the assumption that roads are locally straight line-like structures with almost constant intensity and with significant contrast with the adjacent terrain (background). The original operator is sensitive to the four main orientations and uses a mask to assign a score to each pixel in each of these four orientations. These masks are shown in FIG. 1 for lines in orientations or directions—(a) horizontal b) vertical c) right diagonal d) left diagonal.

The score assigned to each pixel in each of the four orientations depends on:

The difference in intensity between the pixels $a_i$.

The difference in intensity between the pixels $a_i$ and the pixels $b_i$ and $c_i$.

If the intensity values of the pixels $a_i$ ($a_1$, $a_2$ and $a_3$) are similar between them and, at the same time, different from the values of $b_i$ and $c_i$ ($a_1$ different from $b_1$ and $c_1$, $a_2$ different from $b_2$ and $c_2$, $a_3$ different from $b_3$ and $c_3$), the score assigned to the pixel $a_2$ will be close to 1, indicating that that pixel is likely to belong to a road.

More precisely, the score is defined as:

$$\text{score} = \frac{G(|a_1 - a_2|) \times G(|a_2 - a_3|)}{\sum_{i=1}^{3} [F(a_i - b_i) + F(a_i - c_i)]}$$

where: $F(u) + \begin{cases} M & u < 0 \\ M - \frac{(M - 1/6)u}{\theta} & 0 \leq u < \theta \\ 1/6 & u \geq \theta \end{cases}$ and $G(u) = \begin{cases} 1 & 0 \leq u < \theta_1 \\ 1 - (1 - \varepsilon)\frac{u - \theta_1}{\theta_2 - \theta_1} & \theta_1 \leq u \leq \theta_2 \\ \varepsilon & u > \theta_2 \end{cases}$

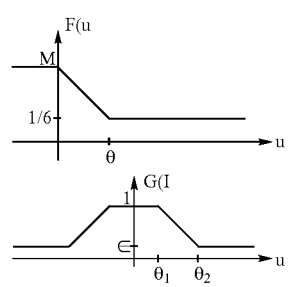

The score for each mask is computed independently from the other masks.

If binary output is required, the authors histogram all the scores produced by the DRO and select the best N percent of the scores as positive road candidates, being N a value typically less than 5%.

Roux, M. *Recalage d'images multi-sources. Application au recalage d'une image SPOT et d'une carte*. Ph.D. thesis, ENST, Paris, France, 1992 relates to a Modified DRO.

The DRO is sensitive to profiles with the structure of two parallel edges with a separation between the edges of 1 to 3 pixels. It is also partially sensitive to profiles of "step" type (separation line between regions with different intensity). To avoid the detection of these profiles, Roux proposed the Modified Duda Road Operator (MDRO), is which the score is computed as:

$$\text{score} = \frac{G(|a_1 - a_2|) \times G(|a_2 - a_3|)}{\max\left(\sum_{i=1}^{3} F(a_i - b_i), \sum_{i=1}^{3} F(a_i - c_i)\right)}$$

P. Dherete and J. Desachy. *Extraction of geographic features using multi-operators fusion*. Proceedings EOS/SPIE EUROPTO'1998 Image Signal Processing for Remote Sensing IV, Barcelona, Spain, September 1998 relates to an Extended modified DRO.

Dhérété introduced the Extended Modified Duda Road Operator (EMDRO), to allow the use of the operator with thicker features. The masks for this modification are shown in FIG. 2 for directions or orientations—(a) horizontal b) vertical c) right diagonal d) left diagonal).

The new score is computed as:

$$\text{score} = \frac{G(|a_1 - a_2|) \times G(|a_2 - a_3|) \times G(|a_3 - a_4|) \times G(|a_4 - a_5|)}{\max\left(\sum_{i=1}^{5} F(a_i - b_i), \sum_{i=1}^{5} F(a_i - c_i)\right)}$$

During the experimentation with this operator, it was detected that the operator is sensitive to roads in the four main orientations but not so sensitive to clear roads in any other orientation.

Aspects of the invention are set out in the accompanying claims. The invention provides a method of detecting lines in an image comprising using one or more masks for detecting lines in one or more directions out of a first direction, a second direction transverse to the first direction, and third and fourth directions of diagonals with respect to said first and second directions, the method further comprising detecting lines in one or more directions additional to said first to fourth directions.

In other words, the invention provides a method of detecting lines in directions additional to the four directions arranged at intervals of 45 degrees (ie horizontal, vertical, left diagonal and right diagonal) that can be identified using the prior art as discussed above. Preferably, the additional directions are identified by using masks, and more preferably using one or more additional masks, but it is possible that additional directions could be identified by using known masks and rotating the image with respect to the known masks. The diagonals are arranged at approximately 45 degrees with respect to the first and/or second directions.

Preferably, a mask used for detecting lines in a first direction, eg left to right, is also used to detect lines in the opposite direction, eg right to left, or where there is more than one mask suitable for detecting a given direction then these are combined or one mask is used in place of two or more masks. This can reduce the number of masks needed and increase the processing speed.

Alternatively, the invention provides a method of detecting lines in an image comprising using one or more masks based on the Duda Road Operator or a modified Duda Road Operator masks for detecting diagonal lines with at least one of the central diagonal mask pixels $a_i$ shifted by at least one pixel in either a vertical or horizontal direction.

According to the invention, new masks have been devised to increase the sensitivity of the operator to roads with an orientation between two of the main orientations.

More specifically, according to a preferred embodiment, the invention provides a new set of masks that increases the sensitivity of the Duda Road Operator from four to eight orientations, maintaining constant the size of the masks (5 by 5 pixels).

An embodiment of the invention will be described with reference to the accompanying drawings, of which:

FIGS. 1a to 1d show masks for a prior art DRO;

FIGS. 2a to 2d show masks for a prior art EMDRO;

Figure 9A:
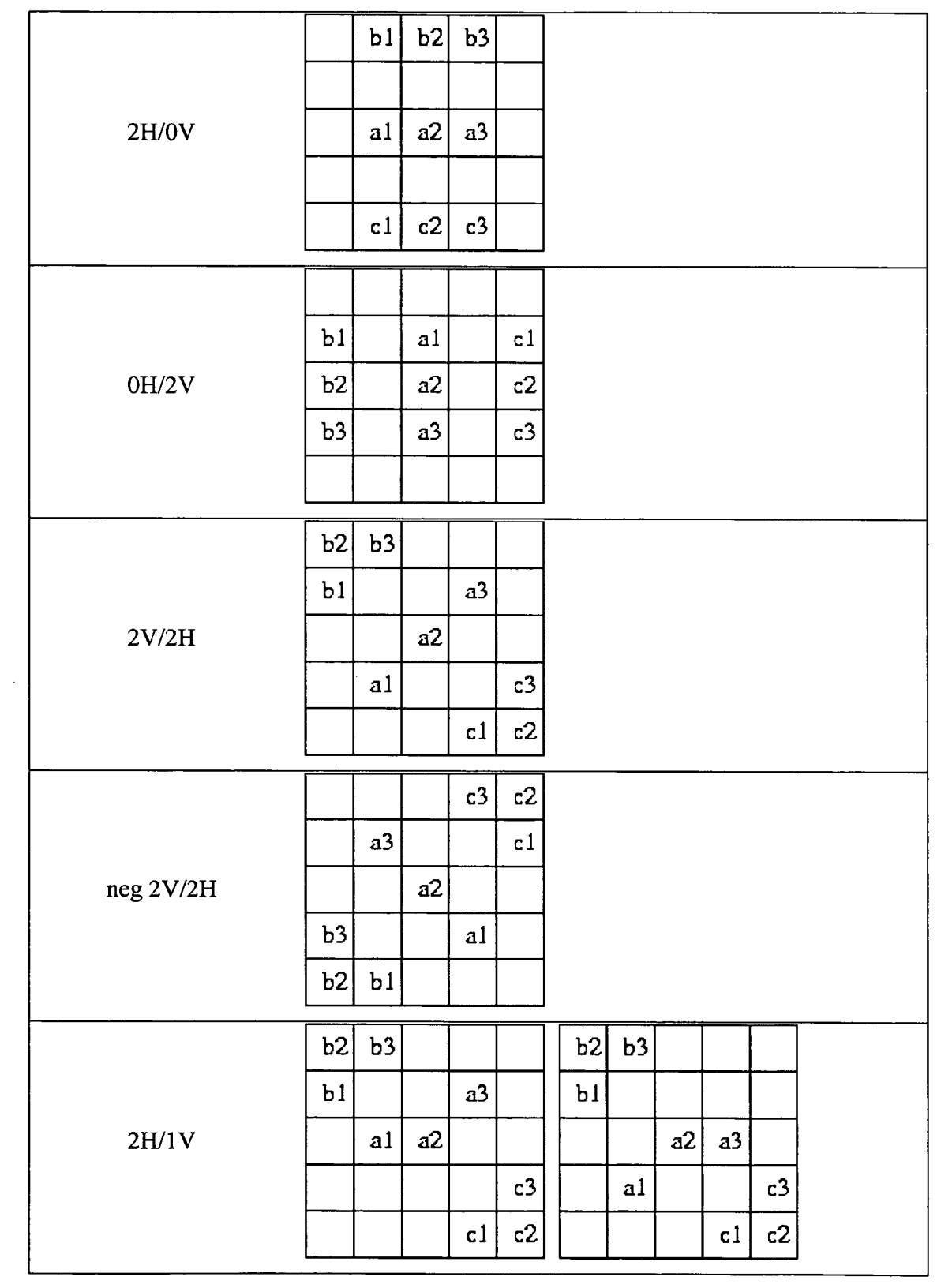
Figure 9B:
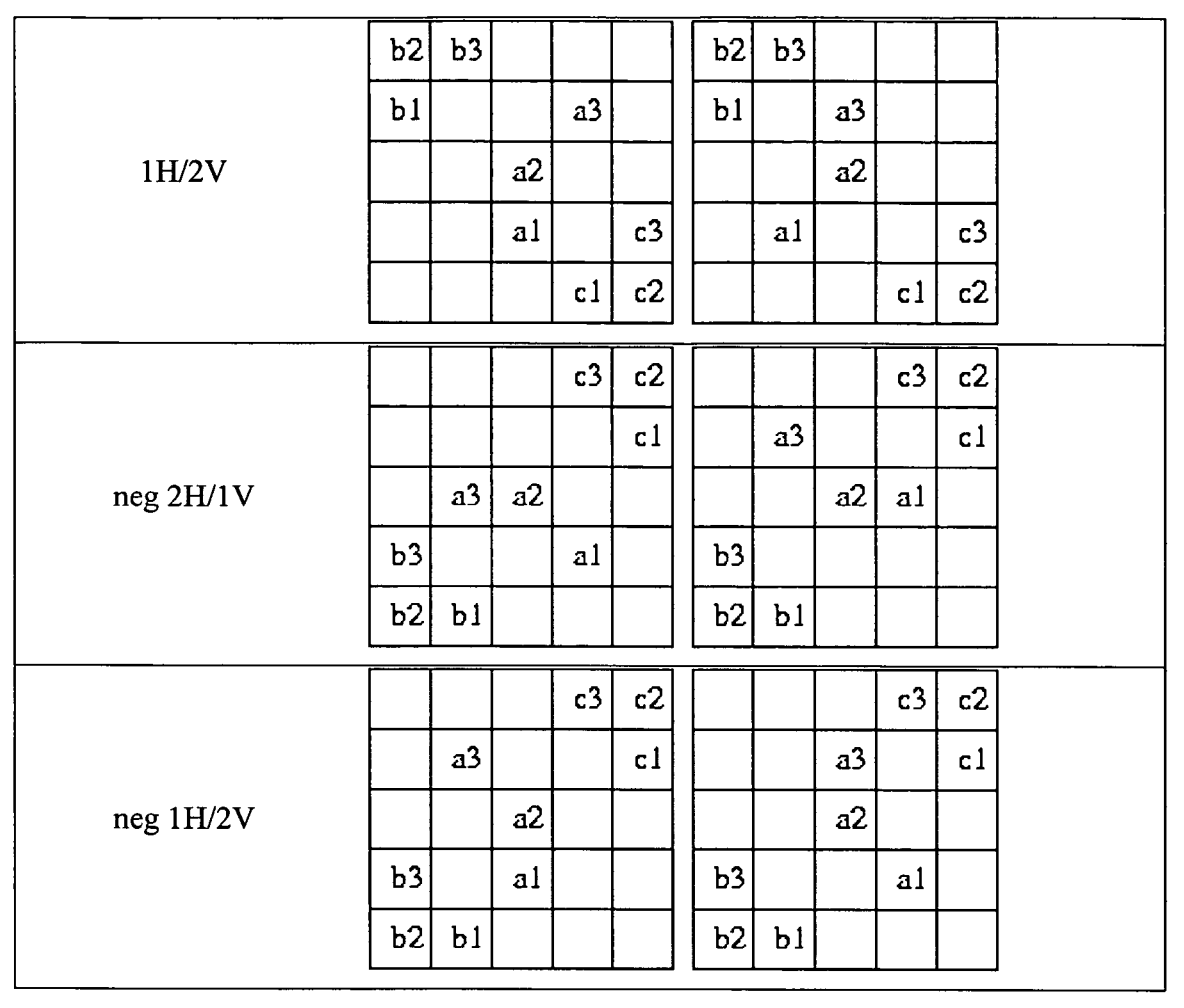

FIGS. 9a to 9b show orientations and corresponding masks for 5×5 blocks;

Figure 10A:
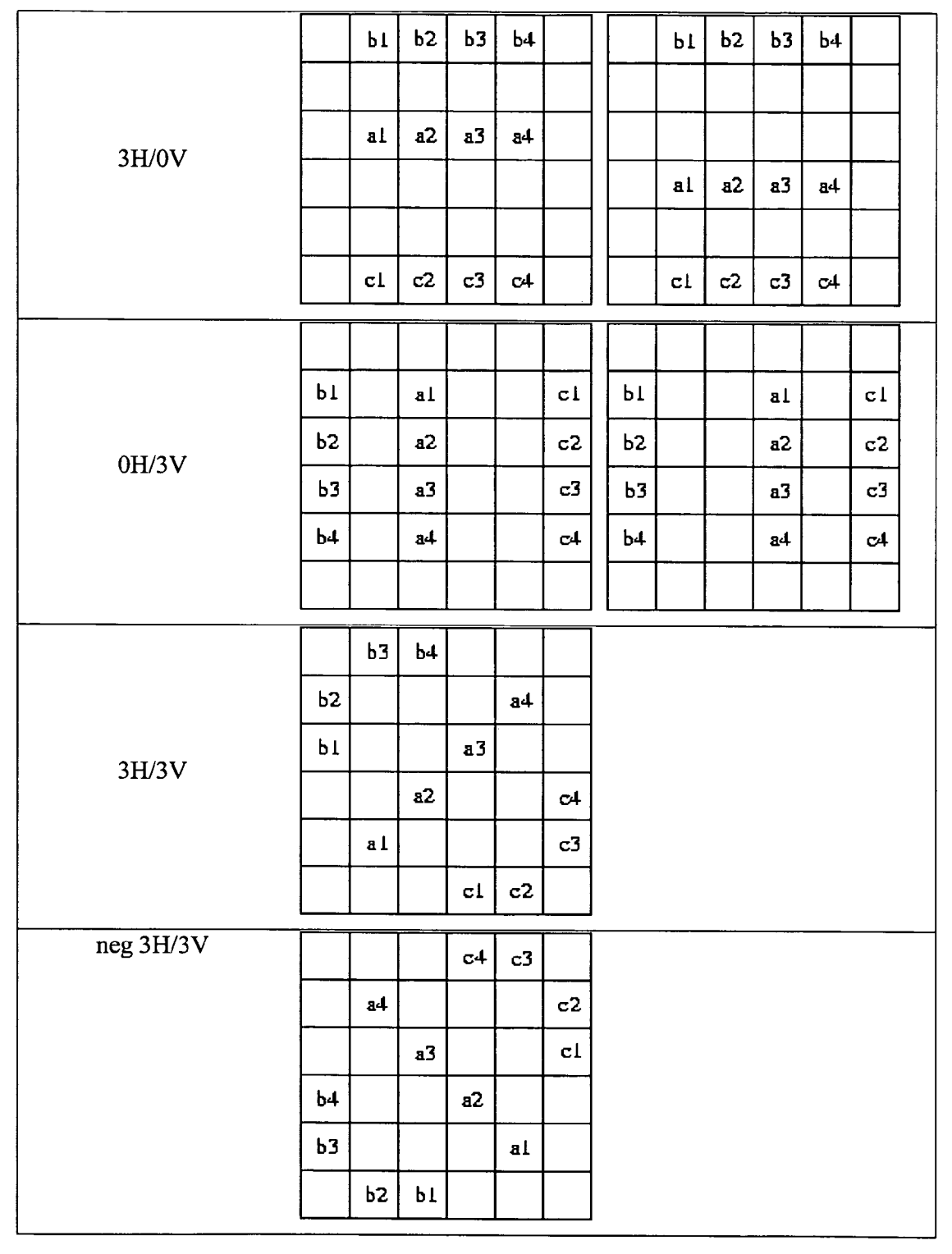
Figure 10C:
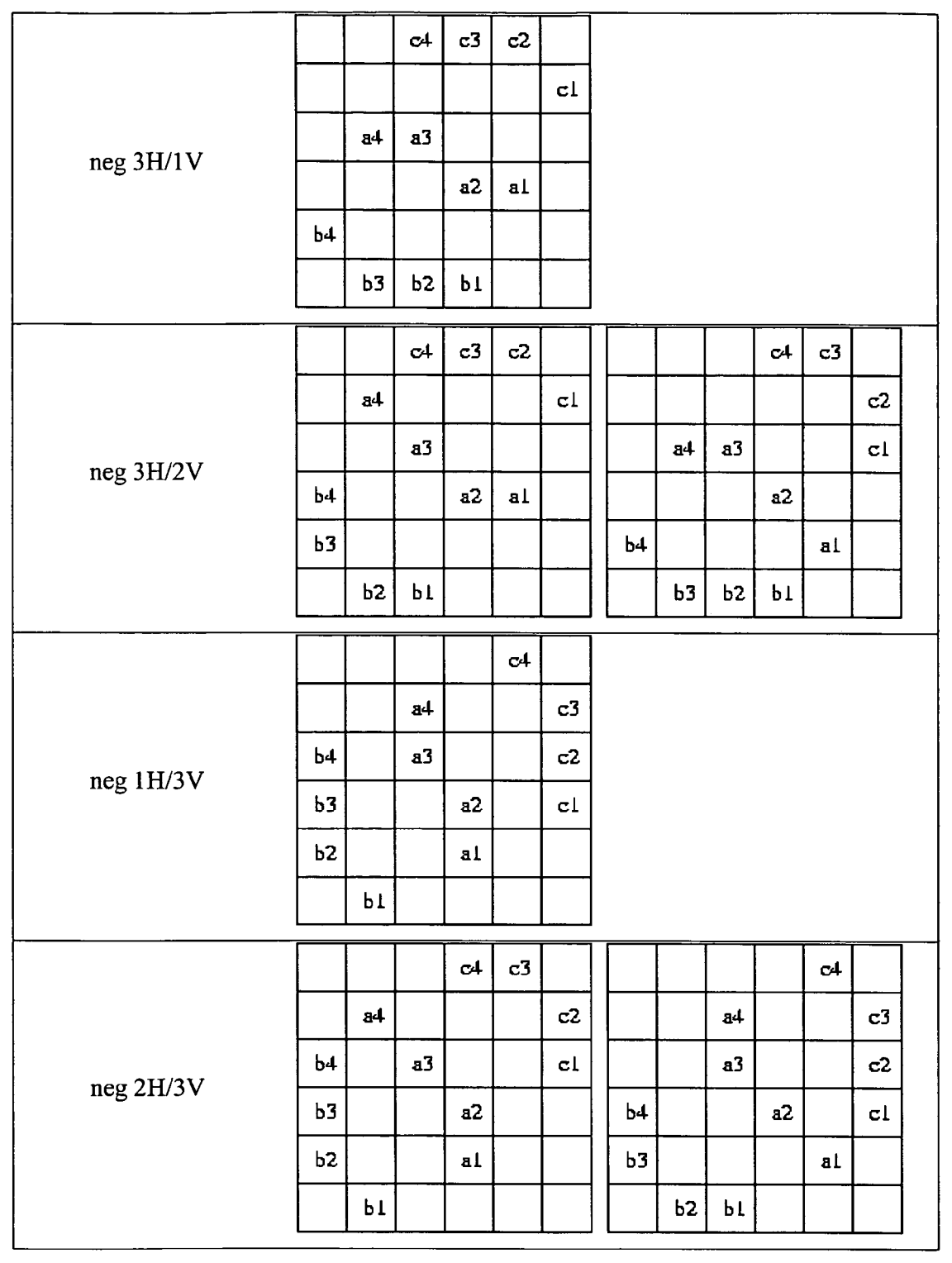

FIGS. 10a to 10c show orientations and corresponding masks for 6×6 blocks; and

Figure 11A:
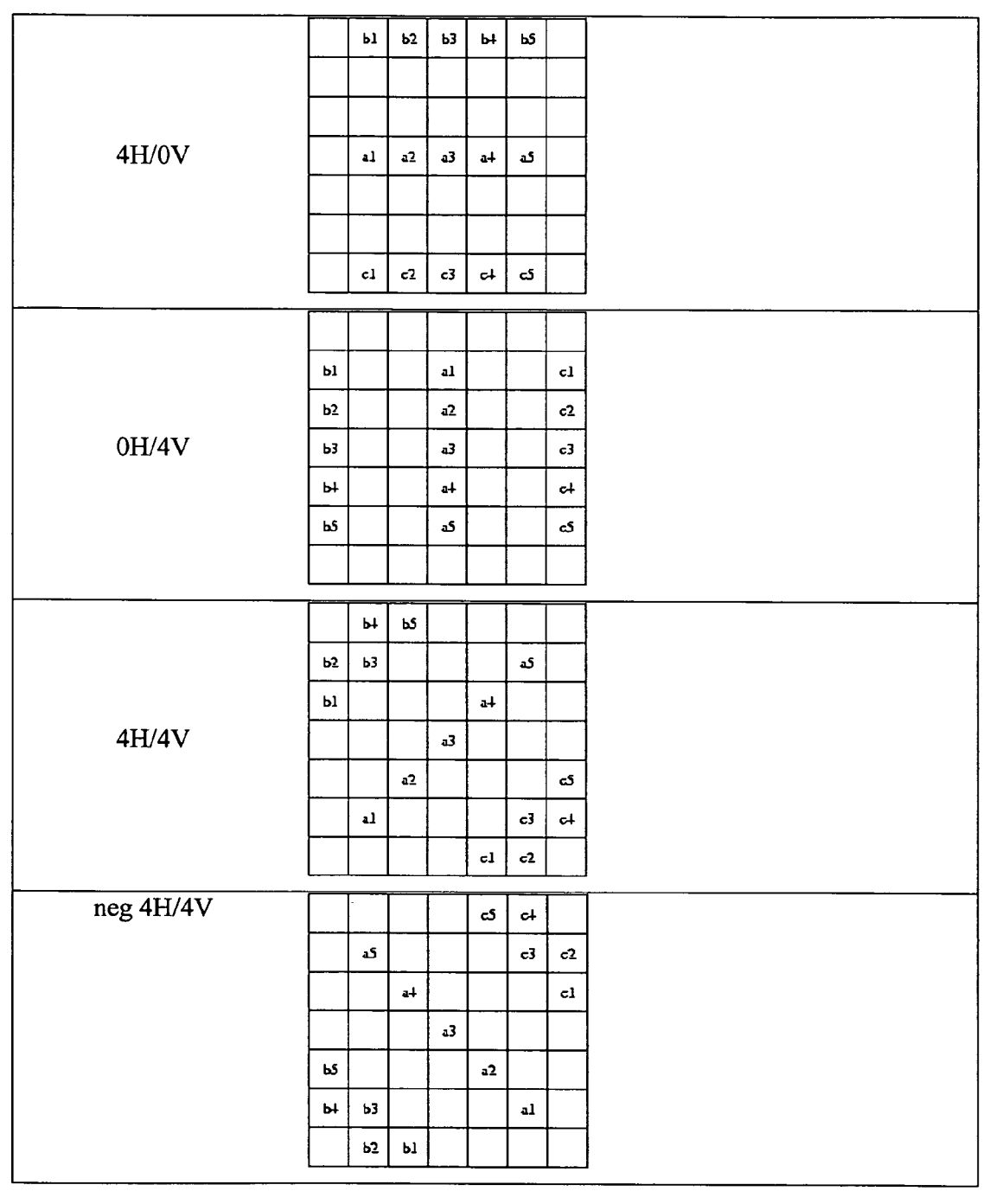
Figure 11B:
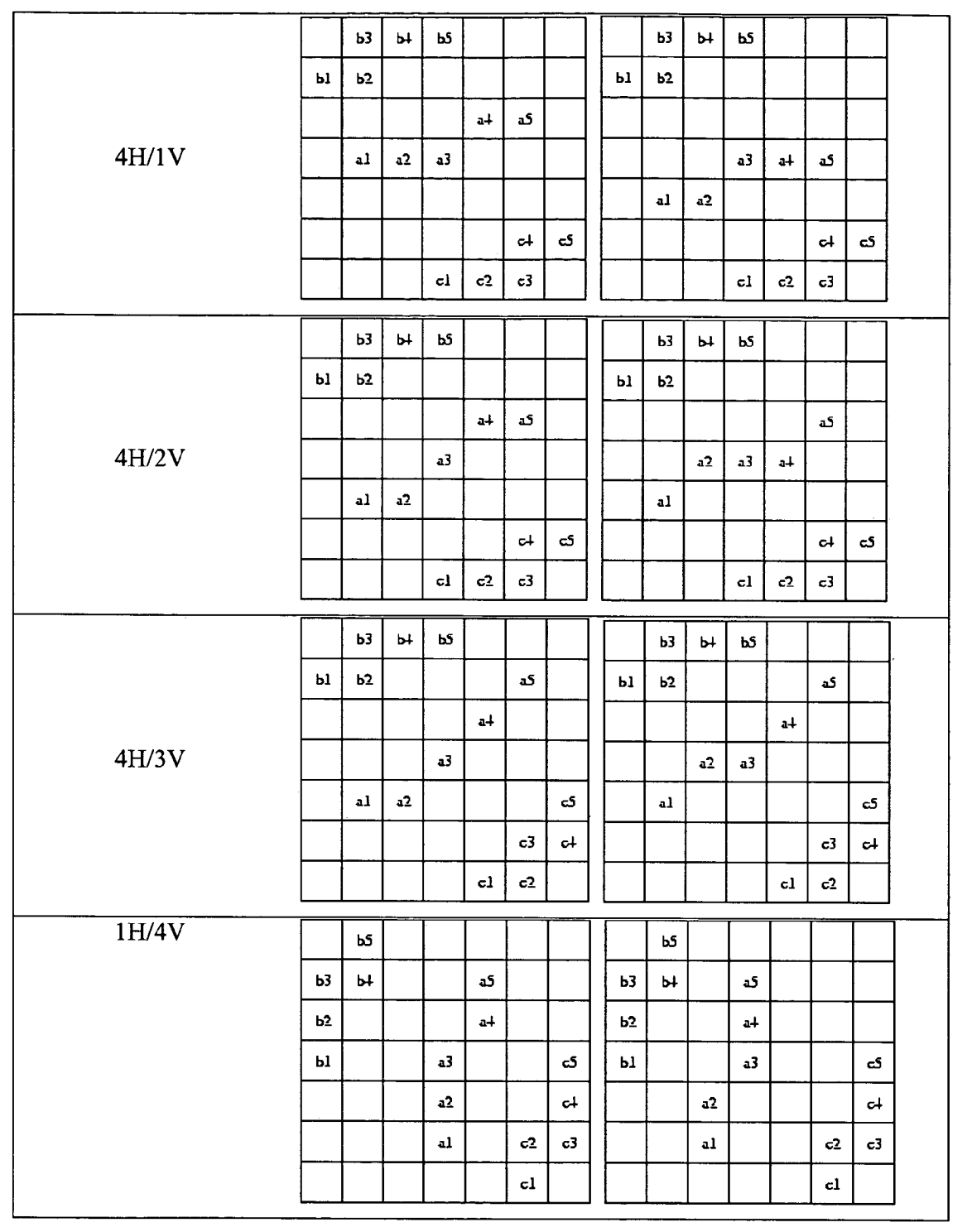
Figure 11C:
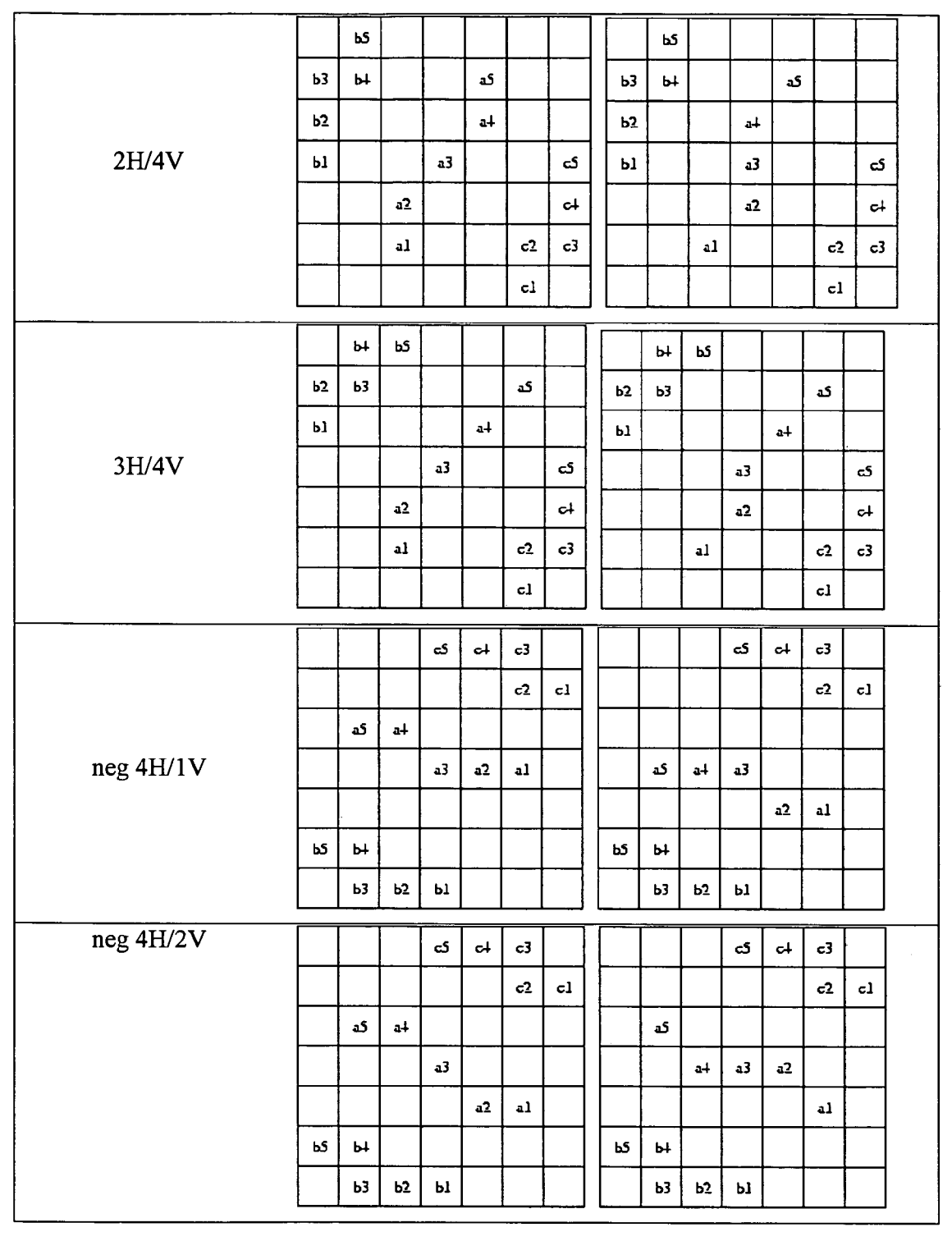
Figure 11D:
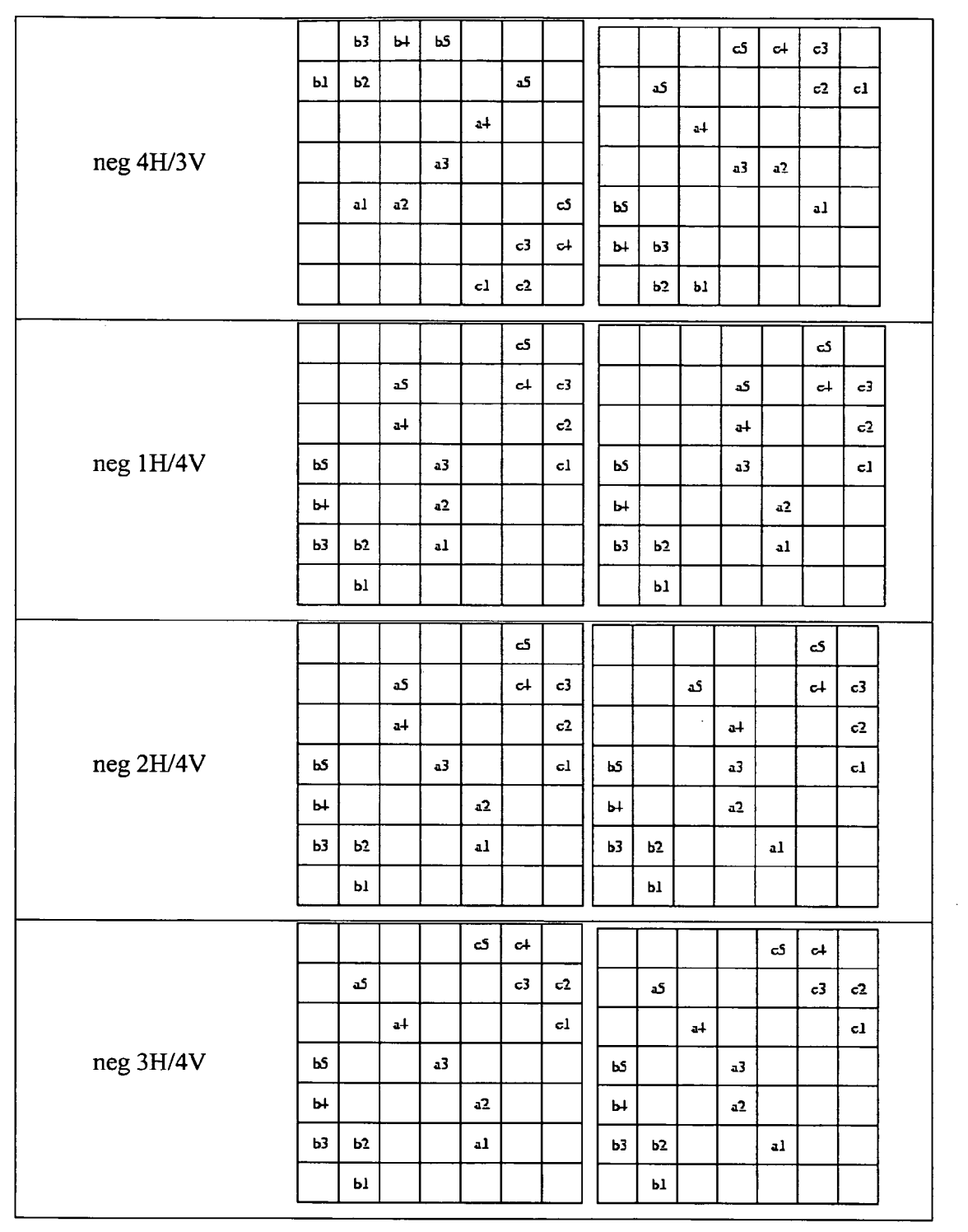

FIGS. 11a to 11d show orientations and corresponding masks for 7×7 blocks.

An embodiment of the invention involves the use of eight new masks, as shown in FIG. 3, in addition to the four masks of the DRO. In FIG. 3, the masks are for detecting lines in directions a) and b) right diagonal horizontal c) and d) right diagonal vertical e) and f) left diagonal horizontal g) and h) left diagonal vertical.

Figures 3A, 3B, 3C, 3D, 3E, 3F, 3G, 3H, 4:
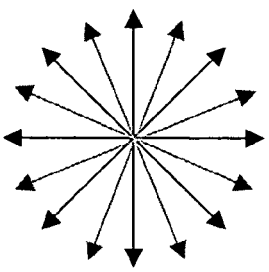
FIGS. 3a to 3h show masks according to an embodiment of the invention.
FIG. 4 illustrates directions for detecting lines.

FIG. 4 shows In black the four orientations the DRO is sensitive to, in grey the additional orientations the new operator is sensitive to. In this embodiment, 5×5 block masks are used, but the invention is not limited to this.

Figure 6:
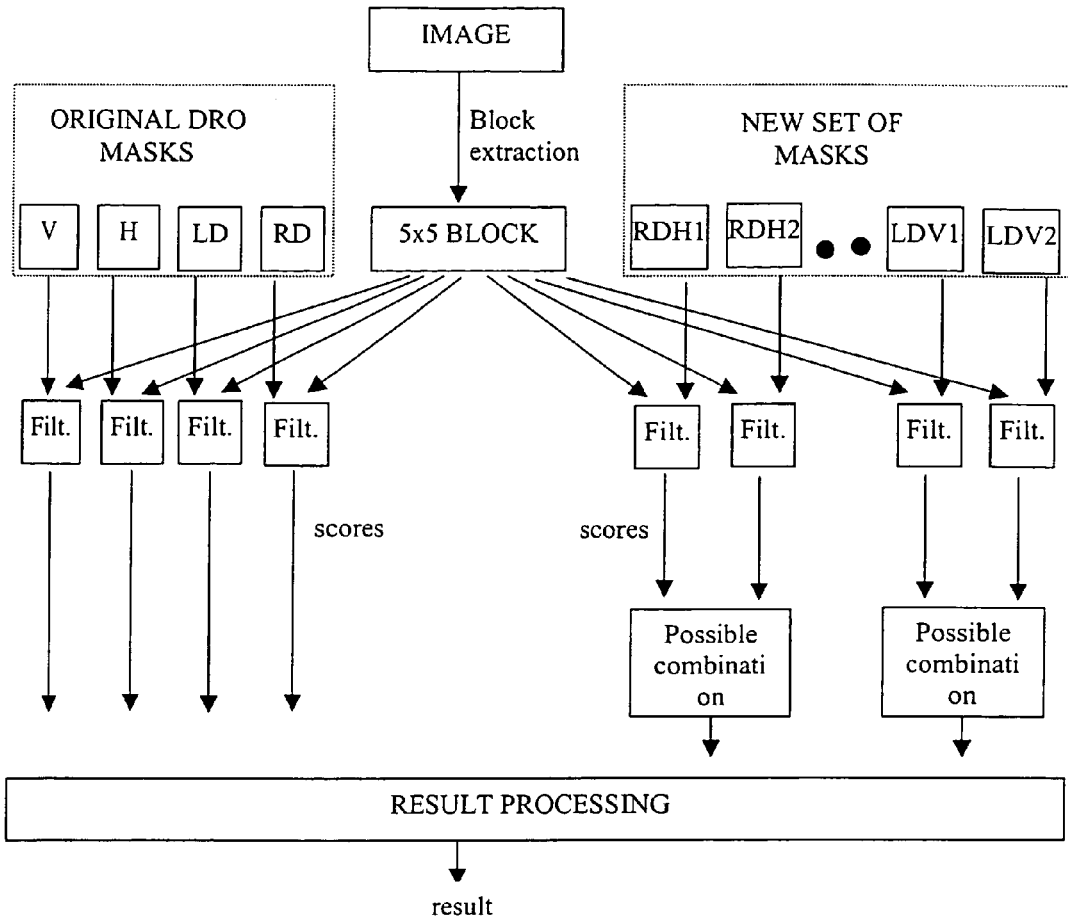
FIG. 6 is a block diagram illustrating processing stages of a method of an embodiment of the invention.
Figure 7:
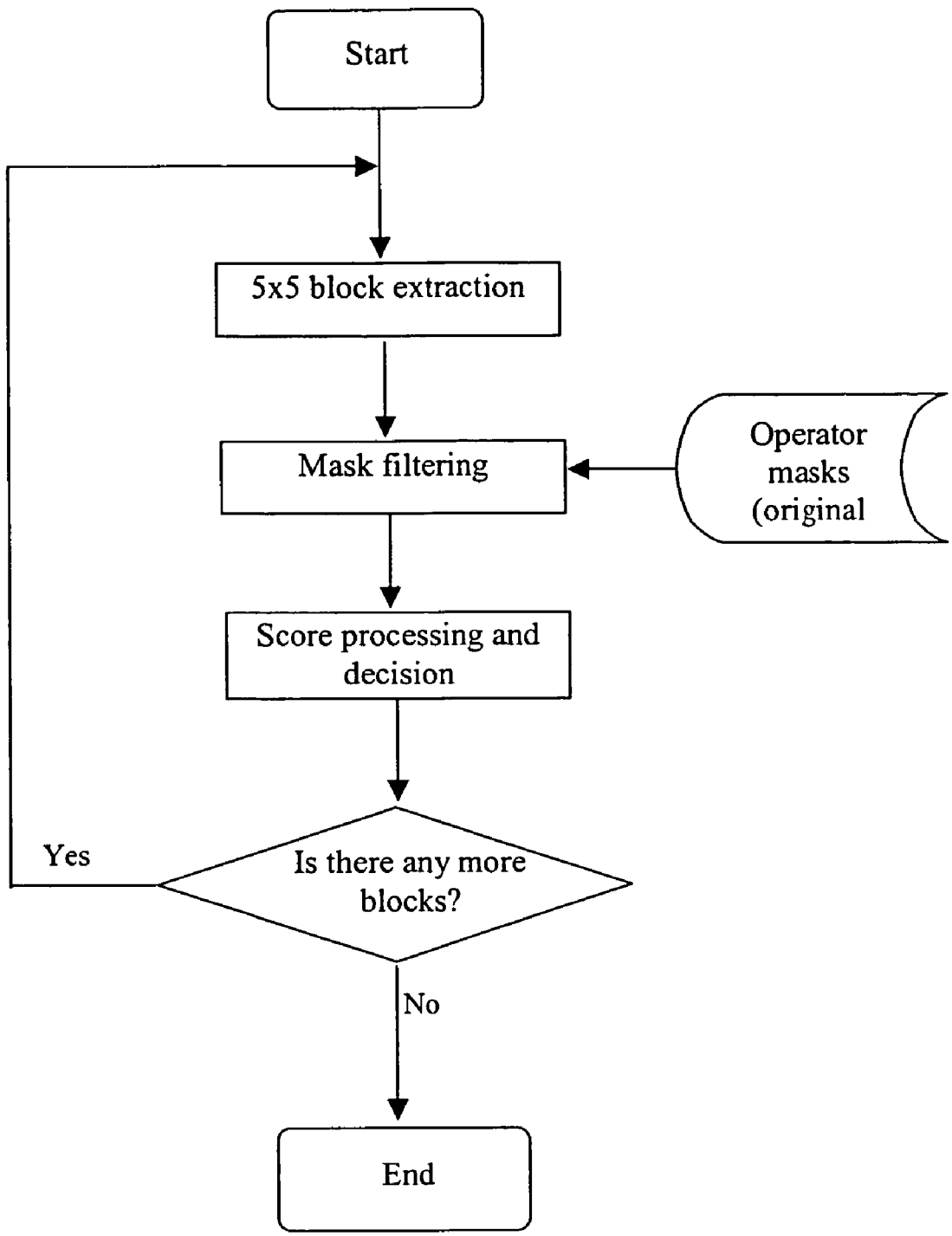
FIG. 7 is a flow diagram illustrating a method of an embodiment of the invention.

FIGS. 6 and 7 illustrate the method steps (processing stages and flow chart diagram) according to the embodiment.

Figure 5A:
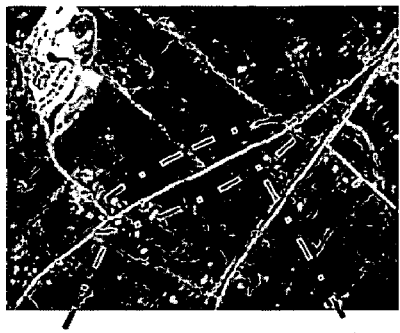
FIG. 5a is an image including lines.
Figure 5B:
FIG. 5b illustrates lines in FIG. 5a detected using a prior art method.
Figure 5C:
FIG. 5c illustrates lines in FIG. 5a detected using a method of an embodiment of the image.

Experiments have shown that the result of the addition of four new sensitive orientations is usually positive. An example is presented in FIG. 5. When the new masks are used (FIG. 5c), the road surrounded by an ellipse is clearly segmented, unlike when only the original masks are used (FIG. 5b).

One key feature of the algorithm of this embodiment is that the size of the masks is kept constant to 5 by 5 pixels. This feature is very important for computational complexity issues as, in a typical scenario, blocks of 5 by 5 pixels from the input image will be loaded on the memory of a computing machine and will be filtered by the set of masks of the original DRO and by the new set of masks. If masks of bigger size were used, it is likely that the algorithm could be made sensitive to even more directions, but it will require to load on memory blocks of different sizes (blocks to be filtered by the original DRO and blocks to be filtered by the new masks), which will result in a much more computationally complex algorithm. Keeping the size of the blocks to 5 by 5 pixels effectively limits the number of directions the algorithm can be made sensitive to, due to digitalisation effect.

The original DRO has one mask for each direction of sensitivity. In the invention presented here, there are two masks for each of the new directions of sensitivity. For each mask the score is computed independently, but the scores of the two masks of a direction can be combined to yield a single score. Typical combination functions are averaging and maximum, i.e. if $score_1$ and $score_2$ are the scores for the two masks, a combined score score can be obtained as follows:

$$score=(score_1+score_2)/2$$

$$score=max(score_1,score_2)$$

The box "Possible combination" in FIG. 6 represents this alternative implementation.

Another alternative implementation is to consider only one of the filters for the new directions of sensitivity. This implementation is twice as fast as the embodiments described above (it uses 4 additional filters instead of 8) and maintains the directions of sensitivity of the operator.

The following describes the generalization of the above embodiment to blocks of any size, and the way to determine, as a function of the block size, the number of directions of sensitivity that can be obtained.

First, a nomenclature that facilitates the task of naming the directions of sensitivity is introduced. Then, the number of detectable directions is worked out as a function of the block size. Finally, examples for the 5×5, 6×6 and 7×7 block sizes are presented.

The process to determine the directions of sensitivity and the masks is the following:

We define a block size (N)

We assume a safety margin of 2 pixels. Therefore, there will be N−2 pixels considered as $a_i$ ($a_1, a_2, a_3, \ldots, a_{N-3}, a_{N-2}$).

Figure 8A:
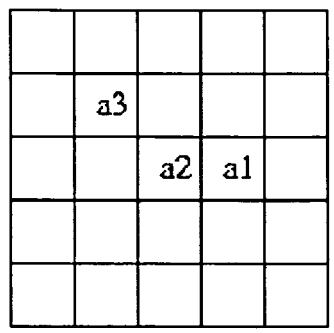
FIGS. 8a to 8c illustrate mask pixels.

Within the block, these N−2 $a_i$ pixels will be located in such a way that they will have a certain horizontal and vertical span, which is defined as the distance (in each axis) between $a_1$ and $a_{N-2}$. The spans are always defined positive; the distinction between right diagonal and left diagonal orientations will be introduced later. For example, in FIG. 8a, the vertical span (v_span) is 1, and the horizontal span (h_span) is 2.

Figure 8B:
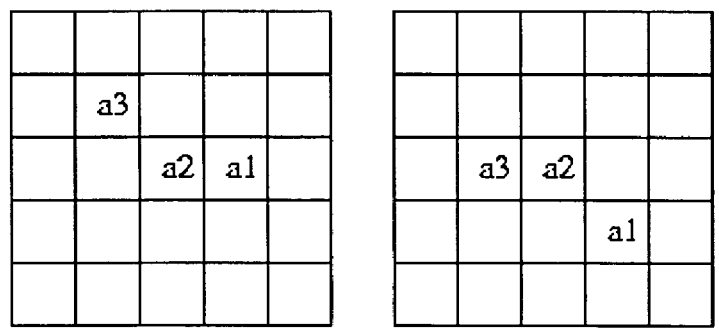
Figure 8C:
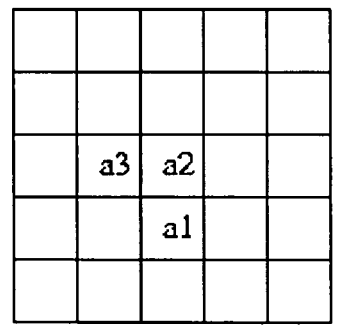

The conditions for the location of the $a_i$'s are:

a. They will be centred in the block.

b. They will be connected.

c. They will be located in a straight line. Due to digitalisation, this straight line will have a "staircase" pattern. Several "staircase" patterns will be possible for a given v_span and h_span, as shown in FIG. 8b.

d. As the line we want to detect is supposed to be straight in the block area, situations with 90 degrees corners of the $a_i$'s are not acceptable, as the one presented in FIG. 8c.

This condition forces either v_span or h_span or both to be equal to N−3. If v_span and h_span are both equal to N−3, then this is equivalent to straight diagonal lines as in the prior art DRO masks. Similarly, v_span or h_span being equal to zero is equivalent to a horizontal or vertical line as in the prior art DRO masks.

We define the parameter orientation as the ratio between h_span and v_span. We represent this parameter as h_span H/v_span V. The letters neg will be added if the orientation is from the top left corner of the block to the bottom right corner. Examples of orientations are 4H/0V, 0V/3H, 3V/3H, neg 2H/4V. In this patent proposal, these orientations represent the orientations that can be detected by an N×N block. Other orientations are not detectable.

The location of the pixels considered as $b_i$ and $c_i$ has to allow the comparison of the gray-level value of the pixels $a_i$'s and the pixels $b_i$'s and $c_i$'s. There is a certain freedom in this location.

Summarizing:
Block size: N
Number of $a_i$'s: N−2
Possible values of h_span and v_span: from 0 to N−3 (at least one of them must be N−3 in any combination).
Detectable orientations:

| h_span = N − 3 | v_span = N − 3 |
|---|---|
| (N − 3)H/0V | 0H/(N − 3)V |
| (N − 3)H/1V | 1H/(N − 3)V |
| (N − 3)H/2V | 2H/(N − 3)V |
| . | . |
| . | . |
| . | . |
| (N − 3)H/(N − 4)V | (N − 4)H/(N − 3)V |
| (N − 3)H/(N − 3)V | |
| neg (N − 3)H/1V | neg 1H/(N − 3)V |
| neg (N − 3)H/2V | neg 2H/(N − 3)V |
| . | . |
| . | . |
| . | . |
| neg (N − 3)H/(N − 4)V | neg (N − 4)H/(N − 3)V |
| neg (N − 3)H/(N − 3)V | |

Total number of detectable orientations: 4N−12

Total number of masks: there could be several "staircase" patterns for each orientation. Therefore, the number of masks will depend on several factors (computationally complexity limitation, accuracy required, etc.).

In the above, neg(N−3)H/0V is equivalent to (N−3)H/0V and so is not repeated and similarly for neg0H/(N−3)V and 0H/(N−3)V.

Following this nomenclature, we can study the case of a 5×5 block:
N=5
3 $a_i$'s: $a_1$, $a_2$ and $a_3$.
Values of h_span and $v_{13}$ span: from 0 to 2.
Detectable orientations:

| h_span = 2 | v_span = 2 |
|---|---|
| 2H/0V | 0H/2V |
| 2H/1V | 1H/2V |
| 2H/2V | |
| neg 2H/1V | neg 1H/2V |
| neg 2H/2V | |

Total number of detectable orientations: 8

The original Duda Road Operator only has 4 orientations of sensitivity: 2H/0V, 0V/2H, 2H/2V and neg 2H/2V. We propose that a better line detection could be obtained by adding the other orientations: 2H/1V, 1H/2V, neg 2H/1V and neg 1H/2V.

As examples, we present in FIGS. 9*a* -9*b*, 10*a*-10*c*, and 11*a*-11*d* respectively the orientations for the block sizes 5×5, 6×6 and 7×7, and some masks for each of the orientations. The left hand side of the Figures indicates orientations and the right hand side show examples of corresponding masks.

The new masks were originally designed to improve the detection of roads in satellite images, but they can also be used to detect other structures such as train lines, canals, coastlines and, in general, any narrow and linear structure in satellite or aerial images. Outside the remote sensing scenario, the masks were also used to detect face wrinkles. They could also be applied to medical images.

In the specification, references to a Duda Road Operator include modifications such as MDRO and EMDRO, except where clear from the context.

In the specification, the term image means a whole image or a region of an image, except where apparent from the context. Similarly, a region of an image can mean the whole image. An image includes a frame or a field, and relates to a still image or an image in a sequence of images such as a film or video, or in a related group of images.

In the specification, the terms horizontal and vertical are arbitrarily applied with respect to the coordinates of the images. For example, horizontal and vertical directions can be interchanged by rotating an image through 90 degrees. Once one direction has been assigned a particular orientation (for example by using a predetermined prior art DRO mask) then this determines the other directions for the image in the same orientation.

The image may be a grayscale or colour image, or another type of multi-spectral image, for example, IR, UV or other electromagnetic image, or an acoustic image etc.

The invention can be implemented for example in a computer system, with suitable software and/or hardware modifications. For example, the invention can be implemented using a computer or similar having control or processing means such as a processor or control device, data storage means, including image storage means, such as memory, magnetic storage, CD, DVD etc, data output means such as a display or monitor or printer, data input means such as a keyboard, and image input means such as a scanner, or any combination of such components together with additional components. Aspects of the invention can be provided in software and/or hardware form, or in an application-specific apparatus or application-specific modules can be provided, such as chips. Components of a system in an apparatus according to an embodiment of the invention may be provided remotely from other components, for example, over the internet.

The invention claimed is:

1. A method of detecting lines in an image using a processor, the method comprising:
using one or more square masks of size N by N pixels for detecting, using a processor, lines in one or more directions out of a first direction, a second direction transverse to the first direction, and third and fourth directions of diagonals with respect to said first and second directions; and
detecting, using a processor, lines in a plurality of directions additional to said first to fourth directions using a plurality of additional square masks of size N by N pixels,
each of said additional square masks having a line of N−2 central mask pixels and two sets of N−2 connected reference pixels placed at the extremities of the additional square masks, each set situated in a direction perpendicular to the direction of the line,
wherein said central mask pixels are centered in the additional square masks, connected, and located in a discrete approximation of a straight line, and have a v_span or h_span equal to N−3, wherein N is the dimensions of the mask block, and v_span and h_span are the vertical and horizontal spans of the central mask pixels.

2. The method of claim 1 wherein the first to fourth directions are horizontal, vertical, left diagonal and right diagonal directions.

3. The method of claim 1 comprising using a Duda Road Operator or a modified Duda Road Operator involving masks for detecting lines in horizontal, vertical, left diagonal and right diagonal directions.

4. The method of claim 1 wherein at least some of the additional masks are based on Duda Road Operator masks.

5. The method of claim 4, wherein at least some of said additional masks are based on the Duda Road Operator masks for detecting diagonal lines with at least one central diagonal mask pixel $a_i$ shifted by at least one pixel in either a vertical or horizontal direction.

6. The method of claim 5 wherein at least some of the additional masks are masks based on the Duda Road Operator masks for detecting diagonal lines with one or more end central diagonal mask pixels $a_i$ shifted by one pixel in either a vertical or horizontal direction.

7. The method of claim 1 wherein for the additional masks not both of v_span and h_span are equal to n−3.

8. The method of claim 1 wherein the size of the masks is 5×5 pixels.

9. The method of claim 1 wherein each additional mask is used for detecting lines in a first direction and in a second opposite direction.

10. The method of claim 1 comprising computing a score indicating the probability that a pixel belongs to a line.

11. The method of claim 9 comprising combining scores for different masks for a direction to determine a combined score.

12. The method of claim1 wherein the masks enable 4N−12 orientations to be detected.

13. An apparatus for detecting lines in an image comprising:

a memory for storing images; and a processor configured to detect lines in one or more directions out of a first direction, a second direction transverse to the first direction, and third and fourth directions of diagonals with respect to said first and second directions using one or more square masks of size N by N pixels, and to detect lines in a plurality of directions additional to said first to fourth directions using a plurality of additional square masks of size N by N pixels, each of said additional square masks having a line of N−2 central mask pixels and two sets of N−2 connected reference pixels placed at the extremities of the additional square mask, each set situated in a direction perpendicular to the direction of the line, wherein said central mask pixels are centered in the additional square mask, connected, and located in a discrete approximation of a straight line, and have a v_span or h_span equal to N−3, wherein N is the dimensions of the mask block, and v_span and h_span are the vertical and horizontal spans of the central mask pixels.

14. A computer readable storage medium storing a computer program for executing a method of claim 1.

* * * * *